Aug. 22, 1944.    J. GEIER    2,356,311
SPIRIT LEVEL DEVICE
Filed March 10, 1943
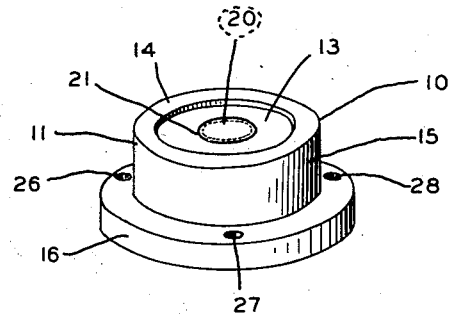
Fig. 1.
Fig. 2.
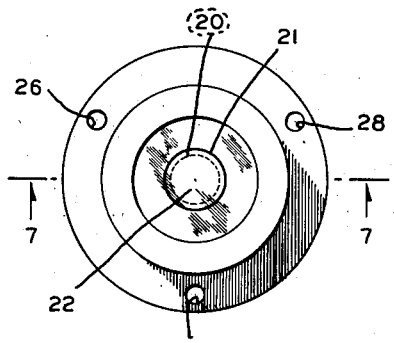
Fig. 4.
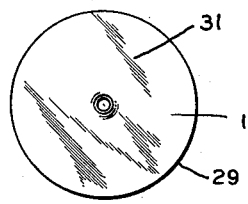
Fig. 3.
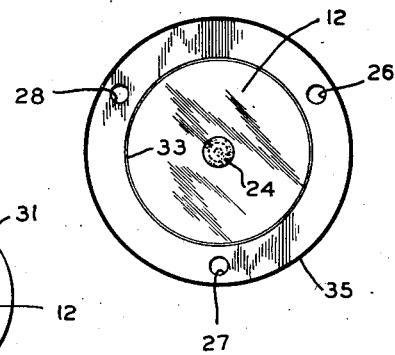
Fig. 5.
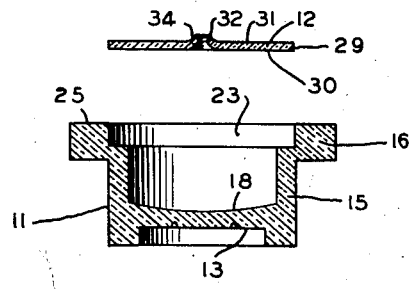
Fig. 7.
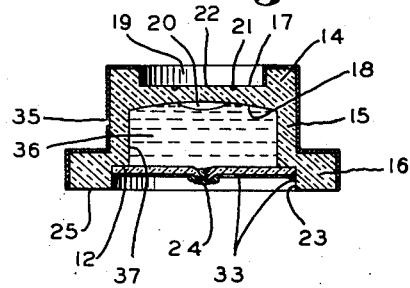
Fig. 6.
INVENTOR
James Geier
BY
Fritz Ziegler
ATTORNEY Patented Aug. 22, 1944

2,356,311

UNITED STATES PATENT OFFICE 2,356,311

SPIRIT LEVEL DEVICE

James Geier, Troy, N. Y.

Application March 10, 1943, Serial No. 478,682

2 Claims. (Cl. 33—212)

This invention relates generally to levels and more particularly to spirit level vials.

Heretofore it has been known to produce a spirit level by filling a glass vial almost full with a liquid of relatively low viscosity leaving a bubble. The vial itself has been made of glass and it has been hermetically sealed to prevent leakage of the liquid by fusing a tip which forms a filling opening. This vial is then mounted within a container usually by the use of a settable material such as plaster of Paris. The container may then be secured to the object which it is desired to level or to a separate instrument such as a long bar which is used as a level gauge.

By reason of the relatively fragile nature of the glass vial the vial is easily broken. This is a serious disadvantage as accidental breakage frequently occurs in locations where replacements are difficult to obtain.

A further disadvantage of the prior construction lies in the fact that the plastic material used for setting the vial within the case or container for the same may be deleteriously affected by vibration, accidental blows or dampness. This results in a cracking or disintegration of the settable mounting material which in turn causes the level to lose accuracy.

It is therefore among the principal objects of the present invention to provide a unitary level of the moving bubble type which overcomes the above described disadvantages.

Another object herein lies in the provision of a level which may be fabricated as a single unit so that it is substantially impossible for the vial portion of the level to shift in position with relation to the case.

Another object herein lies in the provision of a level which is relatively unbreakable and not affected by light blows, vibration or dampness.

Another object herein lies in the provision of level construction which is capable of quantity production yet which is capable of absolute uniformity.

Level construction in accordance with the present invention is attractive in appearance, light in weight and readily attached to the objects or gauges with which it is associated in use.

Another object herein lies in the provision of level construction which may be indirectly illuminated for special uses.

These objects and other incidental ends and advantages will more fully appear in the progress of this disclosure, and be pointed out in the appended claims.

In the drawing similar reference characters designate corresponding parts throughout the several views.

Figure 1 is a view in perspective of a level embodying the invention.

Figure 2 is a top plan view of the level shown in Figure 1.

Figure 3 is a bottom plan view of Figure 2.

Figure 4 is a bottom plan view of the base cover plate.

Figure 5 is a central transverse sectional view of Figure 4 as seen from the plane 5—5 thereon.

Figure 6 is a central vertical sectional view of the parts in inverted position just prior to filling.

Figure 7 is a vertical sectional view of Figure 2 as seen from the plane 7—7 thereon.

In accordance with the invention the level generally indicated by numeral 10 comprises two separate parts, a body 11 and a base cover plate 12. The parts of the body and cover plate are preferably composed of transparent thermosetting plastic material such as "Bakelite" (phenol formaldehyde resin), or a transparent thermoplastic material such as methyl methacrylate. As will be obvious to those skilled in the art, other comparable materials may be used and where the range of temperature permits other thermoplastic materials may be used, such as cellulose nitrate or acetate. Since such plastic materials are moldable under heat and pressure the body 11 and the base plate 12 may be molded in dies so that accuracy and uniformity of the parts may be assured.

The body 11 includes an integral viewing pane 13, a head 14, a cylindrical side wall 15 and a circular mounting flange 16.

The pane 13 preferably has a planar upper surface 17 and a concave lower surface 18. The inner surface of the side wall 15 may be vertically disposed. The bead 14 preferably takes the form of an upwardly extending flange and serves to receive wear or blows and to protect the upper surface 17 against rubbing which might cause abrasion thereof with a consequent loss of visibility through the pane 13. The inner wall 19 of the bead 14 serves to form an optical border for the viewing pane siding the eye of the user to establish the concentricity of the bubble 20, with relation thereto and to the annular groove or guide ring 21. The guide ring is preferably formed in the molding operation in the upper surface 17. The guide ring 21 may be filled with a suitably colored pigment so as to clearly define the area 22 below which the bubble 20 appears when the level is in a true horizontal position.

The inner portion of the circular mounting flange 16 is provided with a rabbet 23. The diameter between the oppositely disposed side walls of the rabbet 23 is sufficient to permit upward movement of the base cover plate 12 while the vertical depth of the side walls of the rabbet 23 is sufficient so that when the cover plate 12 is in its fully seated, it is in its uppermost position above the level of the base surface 25 which is the lower surface of the circular mounting plate 16. The flange 16 is provided with a plurality of orifices 26, 27 and 28 which may be penetrated by screws (not shown) securing the device 10 to any suitable surface.

The base plate 12 is of a configuration and size to conform to the shape and size of the rabbet 23 and includes a peripheral edge 29, a top surface 30, a bottom surface 31 and a funneled orifice 32. The edge 29 is preferably a close fit with the vertical walls of the rabbet 23, and is secured in place by fusing or cementing the same to the vertical surface of the rabbet 23 as well as the horizontal surface thereof by means of cement 33. The funneled orifice is preferably formed by perforating the plate 12 centrally thereof and deforming the edges of the perforations to form the entrance lips 34. These lips 34 may be sealed over by the use of cement which upon setting forms the sealing or closure means 24.

Overlying the exposed external surfaces of the body 11 with the exception of the viewing pane 13 is a protective coat 35 best seen in Figures 3 to 7. This coating is preferably colored so as to contrast with the appearance of the upper surface of the viewing pane 17 and may take the form of a coating of lacquer containing a dye or pigment. The coating 35 not only protects the outermost surfaces of the body 11 but also enables the eye to discern more readily the edge of the planar upper surface 17. Where desired, by reason of the light transmitting properties of the transparent plastic of which the body 11 and the base plate 12 are composed the device 10 may be indirectly read by having light enter the base surface 25 and/or the base plate 12.

The assembly of the device may be readily accomplished in the following manner: Assuming the body 11 to have been as previously described, the same may be placed in an inverted position, corresponding to the position shown in Figure 6, and the edge 29 of the plate 12 is coated with a layer of adhesive or cementitious material. It is preferable that this material 33 be substantially insoluble in the liquid 36 thus where the cement 33 consists of a solution of cellulose acetate in a solvent including amyl acetate and acetone the liquid 36 may be water to which has been added any suitable material for lowering the freezing point thereof, such as ethylene glycol or glycerine. While the cement 33 is still unset the plate 12 is pushed into place into the rabbet 23. After the cement has set, the liquid containing chamber 37 is formed.

In this form the device may be filled with the liquid 36 by instilling the same through the funneled orifice 32. The amount of liquid thus introduced into the chamber 37 affects the size of the bubble 20. When the chamber 37 is properly filled the lips 34 are sealed by placing a blob of cement thereupon. This cement after setting forms the closure means 24.

Upon inversion the device is ready for use and may be secured to any desired instrument or surface as previously described.

It will thus be seen that there has been provided a novel and useful spirit level which is durable, accurate and efficient in use. The case by which the device is mounted upon a surface with which it is to be used is integral with the chamber containing the liquid from which the level reading is taken, so that as long as the case is undistorted a true reading will be obtained, since the chamber containing the liquid may not shift out of position with relation to the case. Constructed of transparent plastic material the device is relatively unbreakable. Where desired novel means of illumination as previously described may be utilized.

It is to be understood that it is not desired to be limited to the exact details of construction shown and described, for obvious modifications will occur to a person skilled in the art.

The following is claimed:

1. A spirit level device comprising a cylindrical body made of a thermoplastic material, said body having an integral viewing pane disposed somewhat below the top thereof, a flange extending from the bottom thereof, said body having an annular recess in the bottom thereof substantially in alignment with said flange, and a base plate spaced-apart from said pane and disposed in said annular recess, the space between said plate and pane constituting a liquid chamber.

2. A spirit level device comprising a cylindrical body made of a plastic material, said body having an integral viewing pane disposed somewhat below the top thereof, a flange extending from the bottom thereof, and said body having an annular recess in the bottom thereof substantially in alignment with said flange, and a transparent apertured base plate spaced apart from said pane and hermetically sealed in said annular recess, the space between said plate and pane constituting a liquid chamber.

JAMES GEIER.